W. FARLOW.
VEHICLE WHEEL.
APPLICATION FILED JAN. 19, 1918.

1,285,655.

Patented Nov. 26, 1918.
2 SHEETS—SHEET 1.

WITNESSES

INVENTOR
W. Farlow,
BY Victor J. Evans
ATTORNEY

W. FARLOW.
VEHICLE WHEEL.
APPLICATION FILED JAN. 19, 1918.
1,285,655.
Patented Nov. 26, 1918.
2 SHEETS—SHEET 2.
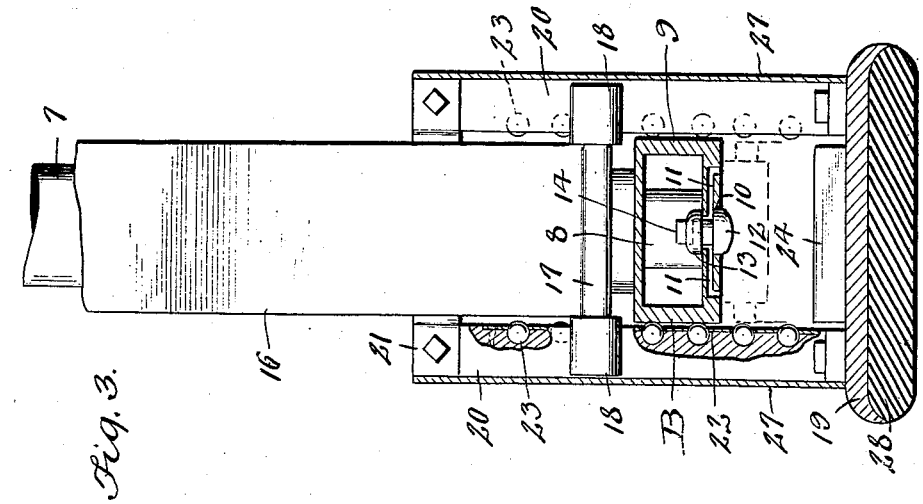
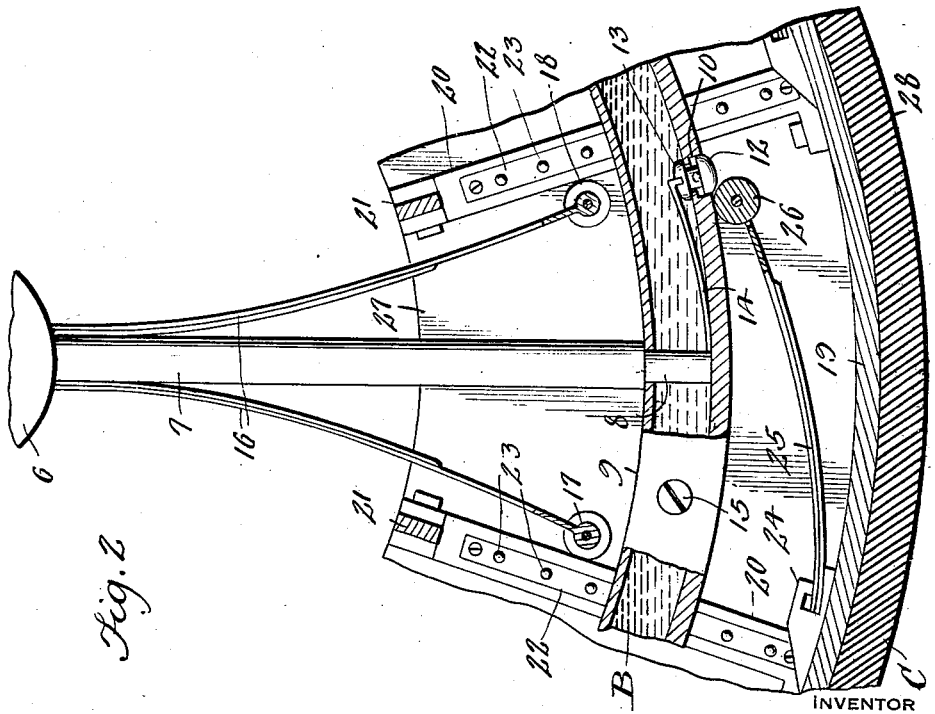
WITNESSES
INVENTOR
W. Farlow,
BY Victor J. Evans
ATTORNEY

UNITED STATES PATENT OFFICE.

WILLIAM FARLOW, OF LAKECREEK, OREGON.

VEHICLE-WHEEL.

1,285,655.  Specification of Letters Patent.  Patented Nov. 26, 1918.

Application filed January 19, 1918. Serial No. 212,758.

*To all whom it may concern:*

Be it known that I, WILLIAM FARLOW, a citizen of the United States, residing at Lakecreek, in the county of Jackson and State of Oregon, have invented new and useful Improvements in Vehicle-Wheels, of which the following is a specification.

This invention relates to vehicle wheels and more particularly to a wheel which is especially adapted for use upon motor vehicles, such as automobiles, and the like.

The primary object of the invention is to provide a vehicle wheel which is so constructed that when applied to a vehicle, the shocks and jars, incident to the travel of the vehicle over an uneven surface will be absorbed by the wheel, without the necessity of employing a pneumatic tire for this purpose.

Another object of the invention is to provide a vehicle wheel comprising inner and outer sections so connected, that the outer section is free to move to a limited extent both circumferentially and vertically with relation to the wheel hub.

A further object of the invention is to provide both the inner and outer sections of the wheel with cushioning members which not only limit the vertical and circumferential movement of the outer section with relation to the inner section but materially reduces the friction between these sections when the wheel is in use.

With these and other objects in view, the invention resides in the novel combination and arrangement of parts, which will be hereinafter described and particularly pointed out in the claims.

The preferred embodiment of the invention has been illustrated in the accompanying drawings, although no restriction is necessarily made to the precise details of construction therein shown, as changes, alterations, and modifications, within the scope of the claims may be resorted to when desired.

In the drawings:

Fig. 2 is a detailed sectional view upon an enlarged scale through a portion of the wheel.

Fig. 3 is a vertical cross section through Fig. 2.

Like characters of reference denote corresponding parts throughout the several views in the drawings.

Figure 1:
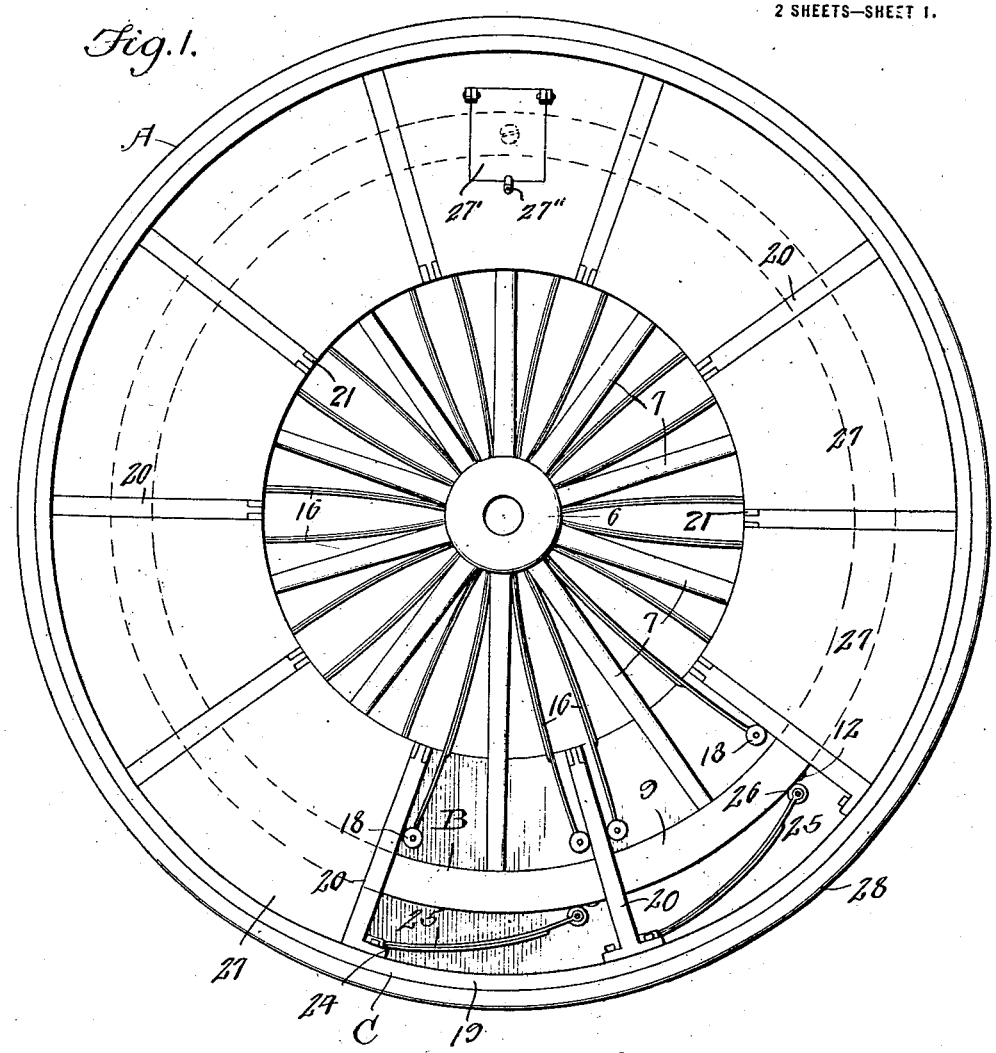
Figure 1 is a view in side elevation of a vehicle wheel constructed in accordance with the invention and with a portion of the outer wheel section removed to show the arrangement of the cushioning members.
Figure 4:
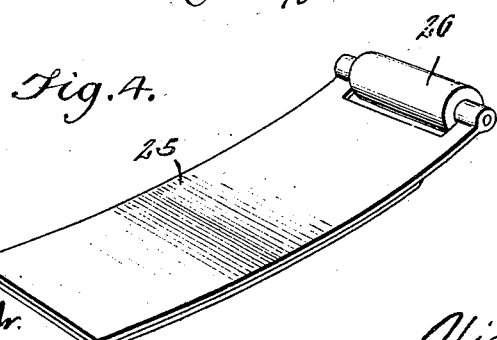
Fig. 4 is a detailed perspective view of one of the cushioning members comprising a part of the outer wheel section.

Referring now to the drawings in detail, the letter A designates a wheel constructed in accordance with the invention. The wheel A comprises inner and outer wheel sections B and C. The inner section B includes a hub 6 from which extend spokes 7, the outer ends of which are reduced to provide tenons 8, extending within an oil reservoir 9, secured thereto and serving as a rim for the inner wheel section.

The outer face of the oil reservoir 9 has formed therein spaced openings 10 with which communicate oil ducts 11 normally closed by valves 12 slidably mounted in the openings 10 and having their heads 13 held extended beyond the outer face of the oil reservoir 9 by springs 14. The reservoir 9 has formed in the side thereof a filling opening which is closed by a cap 15.

Arranged in pairs between the spokes 7 are oppositely curved leaf springs 16, the inner ends of which are secured to the spokes and hub, while the outer ends of the springs are provided with bearings 17 in which they are mounted to turn rollers 18.

The outer wheel section C has a rim 19 having secured to the inner face thereof, the free ends of the arms 20 on spaced yokes 21 extending inwardly from the rim and beyond the oil reservoir 9 to engage the rollers 18. The opposing faces of the arms 20 of the yokes are provided with ball cages 22 in which are arranged bearing balls 23. The balls 23 contact with the sides of the oil reservoir 9 to reduce the friction occasioned by the movement of the wheel sections.

Secured to the inner face of the rim 19 between the arms of each yoke 21 is a block 24 having connected therewith an end of a curved leaf spring 25. The free end of the spring has mounted to turn therein, a roller 26 which is firmly held in engagement with the outer face of the oil reservoir 9 by the spring to limit the vertical movement of the outer wheel section with relation to the hub, and also to operate the valves 12 to from the reservoir 9 to be dis- on the rollers 26 and the balls in ~ages on the arms of the yokes.

Plates 27 are detachably connected with the arms of the yokes which extend from the rim 19 beyond the oil reservoir 9 to prevent the accumulation of matter between the rim 19 and oil reservoir which might interfere with the cushioning effect of the springs 25. One of the plates 27 has formed therein an opening through which access may be had to the cap 15, said opening being closed by a door 27' hinged to the plate 27 and held in closed position by a suitable fastener 27".

The outer face of the rim 19 has connected therewith a tire 28 which is preferably formed from resilient material to render the wheel noiseless when in use.

When the wheel is in use, it will be seen that the springs 16 firmly hold the rollers 18 in contact with the arms of the yokes 21 and limit the circumferential movement of the outer wheel section with relation to the hub, while the springs 25 and rollers 26 serve as yieldable supports for the inner wheel sections and also limit the vertical movement of the wheel sections with relation to the hub.

From the foregoing description, taken in connection with the accompanying drawings, it is at once apparent that a vehicle wheel has been provided which though simple in construction, and inexpensive of manufacture, is highly efficient in use for the purpose set forth.

Having thus described the invention, what is claimed as new is:

1. A wheel having an inner section, an outer section, cushioning members interposed between said sections, yokes having connection with the outer section and engaging the inner section, spring arms on the inner section, and rollers on said arms engaging said yokes.

2. A wheel comprising an inner section, an outer section movable circumferentially on the inner section, cushioning means interposed between said sections, spaced pairs of spring arms on the inner section, yokes on the outer section passing between the arms of each pair of arms on the inner section, and rollers on said arms engaging the sides of said yokes.

3. A wheel comprising an inner section having a rim, an outer section, cushioning members on the outer section engaging said rim, yokes on the outer section extending below said rim, and spring arms on the inner section below said rim engaging said yokes.

4. A wheel comprising an inner section, a hollow rim on the inner section having spaced openings therein, valves mounted to operate in said openings, an outer section, yokes slidably connecting the outer section with the inner section, springs connected with the outer section, and rollers engageable with said valves carried by said springs.

In testimony whereof I affix my signature.

WILLIAM FARLOW.

Copies of this patent may be obtained for five cents each, by addressing the "Commissioner of Patents, Washington, D. C."